United States Patent
Sugawara et al.

(10) Patent No.: US 10,663,971 B2
(45) Date of Patent: May 26, 2020

(54) LANE CHANGE SYSTEM

(71) Applicant: HITACHI AUTOMOTIVE SYSTEMS, LTD., Hitachinaka-shi, Ibaraki (JP)

(72) Inventors: Toshiharu Sugawara, Tokyo (JP); Masato Imai, Tokyo (JP); Kiyoshi Yorozuya, Ibaraki (JP)

(73) Assignee: HITACHI AUTOMOTIVE SYSTEMS, LTD., Hitachinaka-Shi (JP)

( * ) Notice: Subject to any disclaimer, the term of this patent is extended or adjusted under 35 U.S.C. 154(b) by 159 days.

(21) Appl. No.: 15/739,349

(22) PCT Filed: Aug. 5, 2016

(86) PCT No.: PCT/JP2016/073031
§ 371 (c)(1),
(2) Date: Dec. 22, 2017

(87) PCT Pub. No.: WO2017/056726
PCT Pub. Date: Apr. 6, 2017

(65) Prior Publication Data
US 2018/0188735 A1    Jul. 5, 2018

(30) Foreign Application Priority Data

Sep. 30, 2015    (JP) ................. 2015-192516

(51) Int. Cl.
*G05D 1/02*    (2020.01)
*B60W 30/095*    (2012.01)
(Continued)

(52) U.S. Cl.
CPC .......... *G05D 1/0214* (2013.01); *B60W 10/20* (2013.01); *B60W 30/08* (2013.01);
(Continued)

(58) Field of Classification Search
None
See application file for complete search history.

(56) References Cited

U.S. PATENT DOCUMENTS 5,521,579 A * 5/1996 Bernhard ............... G08G 1/166
340/438
2010/0228419 A1* 9/2010 Lee ...................... G05D 1/0257
701/25

(Continued)

FOREIGN PATENT DOCUMENTS

DE    10-2013-010983 A1    1/2015
JP    H09-301210 A    11/1997
(Continued)

OTHER PUBLICATIONS

Supplementary European Search Report issued in corresponding European Application No. EP 16850903 dated Apr. 18, 2019.
International Search Report with English translation and Written Opinion issued in corresponding application No. PCT/JP2016/073031 dated Nov. 8, 2016.

*Primary Examiner* — Jonathan M Dager
*Assistant Examiner* — Garrett F Evans
(74) *Attorney, Agent, or Firm* — Foley & Lardner LLP

(57) ABSTRACT

A lane change system that ensures safety is provided. This lane change system changes lanes by controlling steering in accordance with a path moving from a first lane in which the host vehicle is traveling to a second lane different from the lane in which the host vehicle is traveling, wherein the lane changing is stopped when there are any peripheral vehicles at high risk for collision in the second lane during a lane change from the first lane to the second lane.

7 Claims, 14 Drawing Sheets

(51) Int. Cl.
*G06K 9/00* (2006.01)
*B62D 15/02* (2006.01)
*B60W 30/12* (2020.01)
*B60W 10/20* (2006.01)
*B60W 30/08* (2012.01)
*B60W 30/18* (2012.01)
*G08G 1/16* (2006.01)

(52) U.S. Cl.
CPC ...... *B60W 30/095* (2013.01); *B60W 30/0953* (2013.01); *B60W 30/0956* (2013.01); *B60W 30/12* (2013.01); *B60W 30/18163* (2013.01); *B62D 15/0255* (2013.01); *B62D 15/0265* (2013.01); *G06K 9/00798* (2013.01); *G06K 9/00805* (2013.01); *G08G 1/167* (2013.01); *B60W 2554/80* (2020.02); *G05D 2201/0213* (2013.01)

(56) References Cited

U.S. PATENT DOCUMENTS

| | | |
|---|---|---|
| 2011/0130936 A1 | 6/2011 | Noda |
| 2012/0296522 A1 | 11/2012 | Okuta |
| 2016/0297447 A1* | 10/2016 | Suzuki .................. B60W 30/16 |

FOREIGN PATENT DOCUMENTS

| | | |
|---|---|---|
| JP | 2989651 B2 | 12/1999 |
| JP | 2008-149855 A | 7/2008 |
| JP | 2009-248892 A | 10/2009 |
| JP | 2009-280015 A | 12/2009 |
| JP | 2011-113511 A | 6/2011 |
| JP | 2013-129328 A | 7/2013 |
| JP | 2015-168406 A | 9/2015 |
| WO | WO-2015/052865 A1 | 4/2015 |

* cited by examiner

FIG. 5
(a) DISPLAY USING TURN SIGNAL
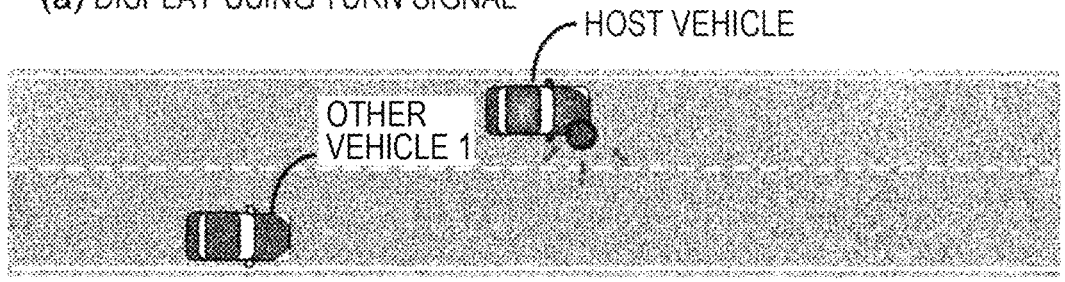
(b) CONTROL HOST VEHICLE TO TAKE ALONG BOUNDARY AGAINST ADJACENT LANE TO WHICH LANE IS DESIRABLY CHANGED
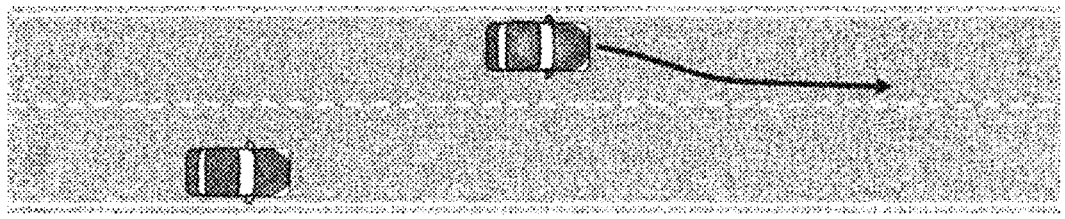
(c) TRANSMIT INFORMATION VIA VEHICLE-TO-VEHICLE TRANSMISSION
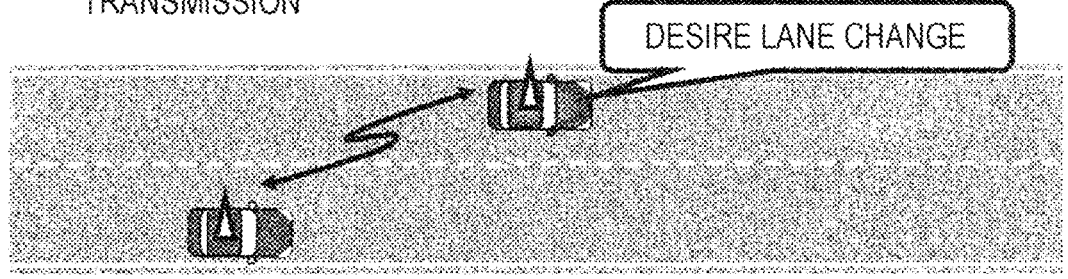

RELATIVE POSITIONS AND RELATIVE SPEED OF PERIPHERAL VEHICLES

FIG. 10
(a)
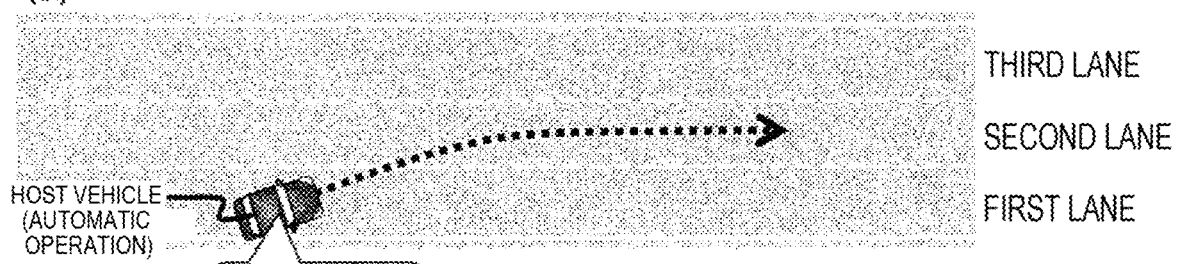
(b)
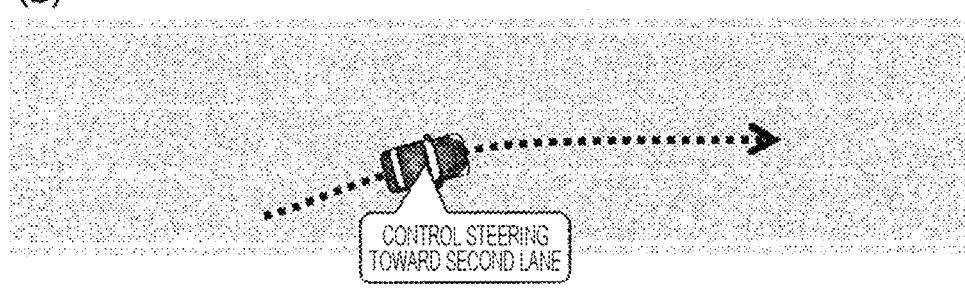
(c)
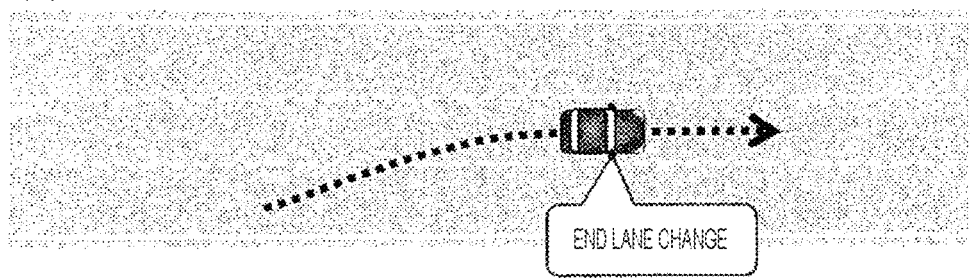

FIG. 11
(a)
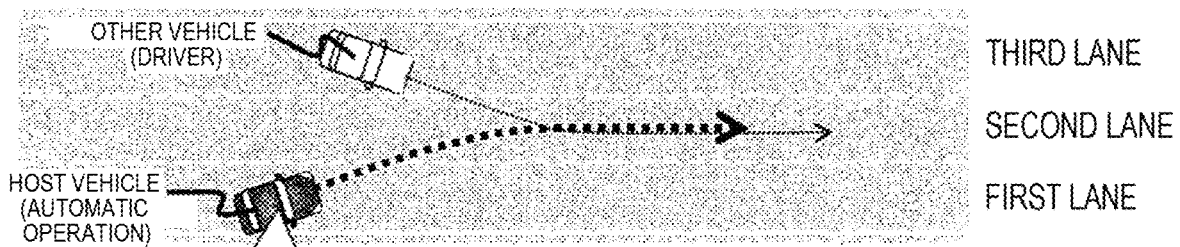
(b)
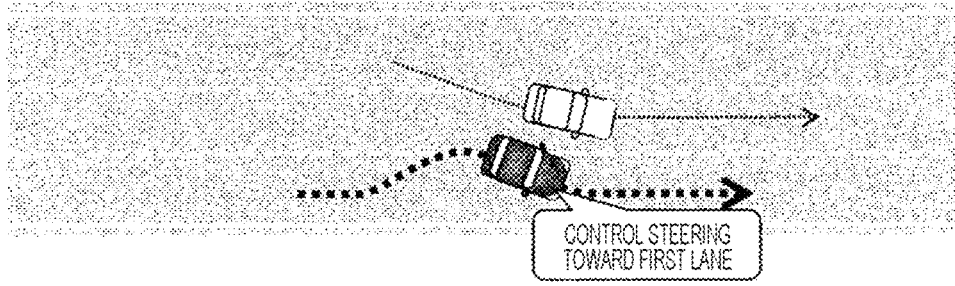
(c)
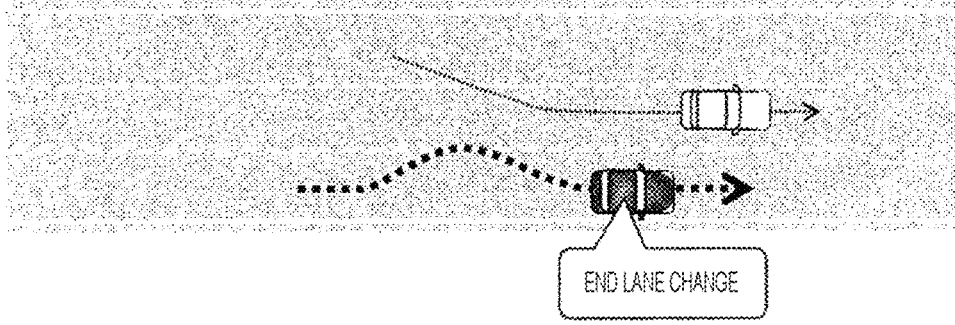

FIG. 14
(a)
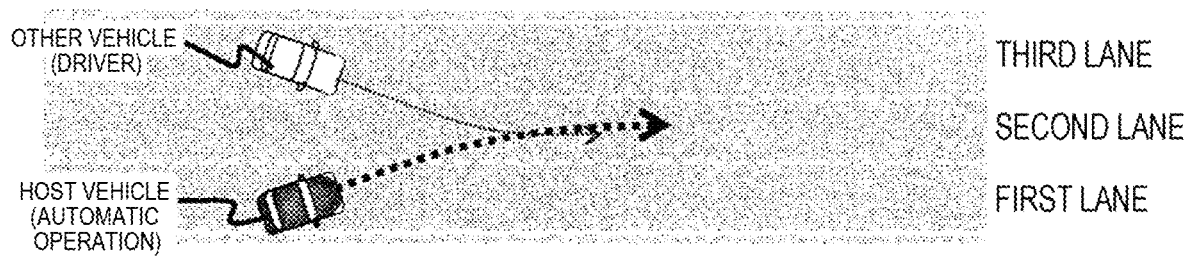
(b)
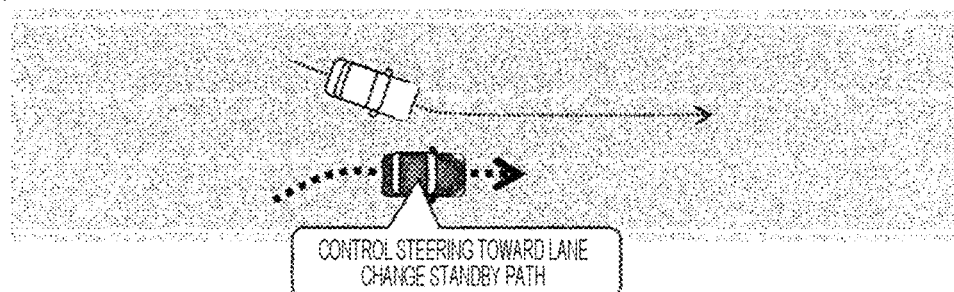
(c)
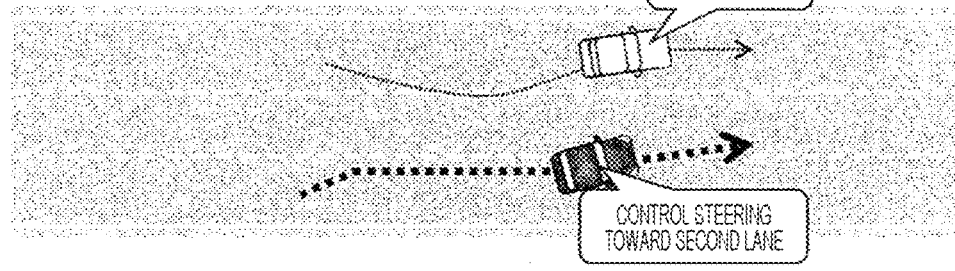

LANE CHANGE SYSTEM

TECHNICAL FIELD

The present invention relates to a control system for a vehicle that automatically changes lanes.

BACKGROUND ART

PTL 1 discloses a "travel control device for an autonomous vehicle including an image input means for external world recognition, the travel control device for an autonomous vehicle that is characterized by including: an extraction means for extracting a traveling lane from an input image; a specifying means for specifying a lane through which the vehicle passes when the vehicle changes the lane from the traveling lane extracted by the extracting means; a calculation means for calculating an angle formed by the lane specified by the specifying means and a horizontal line; a detection means for detecting vehicle speed; and a control means for controlling steering based on the angle calculated by the calculation means and the vehicle speed detected by the detection means when there is a request for a lane change".

According to PTL 1, it is possible to perform a steering angle control based on the angle formed by the traveling lane extracted by image processing and the horizontal line and the vehicle speed, and it is possible to smoothly and safely perform the lane change using autonomous travel control. Further, it is possible to perform the steering control based on any one reference line between two reference lines that partition the lane ahead of the vehicle extracted by the image processing, and thus, it is possible to continue the steering angle control based on the other reference line even when the reference line that is being used deviates from the input image in the middle of the steering angle control in the traveling lane during traveling or during the lane change. Thus, it is possible to more reliably, smoothly, and safely perform the autonomous travel control.

CITATION LIST

Patent Literature

PTL 1: JP 2989651 B1

SUMMARY OF INVENTION

Technical Problem

However, PTL 1 does not consider how to correct a path with respect to a dangerous vehicle when a parallel running vehicle has performed a lane change from the other lane to a lane as a change destination in the middle of the lane change of a host vehicle. That is, how to generate a safe path and avoid a collision in the above situation is a problem.

An object of the present invention is to provide a lane change system that ensures safety.

Solution to Problem

In order to solve the above problem, one of desirable aspects of the present invention is as follows. In a lane change system that changes lanes by controlling steering in accordance with a path moving from a first lane in which a host vehicle is traveling to a second lane different from the lane in which the host vehicle is traveling, the lane changing is stopped when there are any peripheral vehicles at high risk for collision in the second lane during a lane change from the first lane to the second lane.

Advantageous Effects of Invention

According to the present invention, it is possible to provide the lane change system that ensures safety.

BRIEF DESCRIPTION OF DRAWINGS

FIG. 5 is a view illustrating display of a lane change intention according to the first and second embodiments.

FIG. 10 is Operation Example 1 of a lane change system according to the first embodiment.

FIG. 11 is Operation Example 2 of the lane change system according to the first embodiment.

FIG. 14 is Operation Example 2 of the lane change system according to the second embodiment.

DESCRIPTION OF EMBODIMENTS

Hereinafter, embodiments of a lane change system of the present invention will be described with reference to the drawings.

First Embodiment

Figure 1:
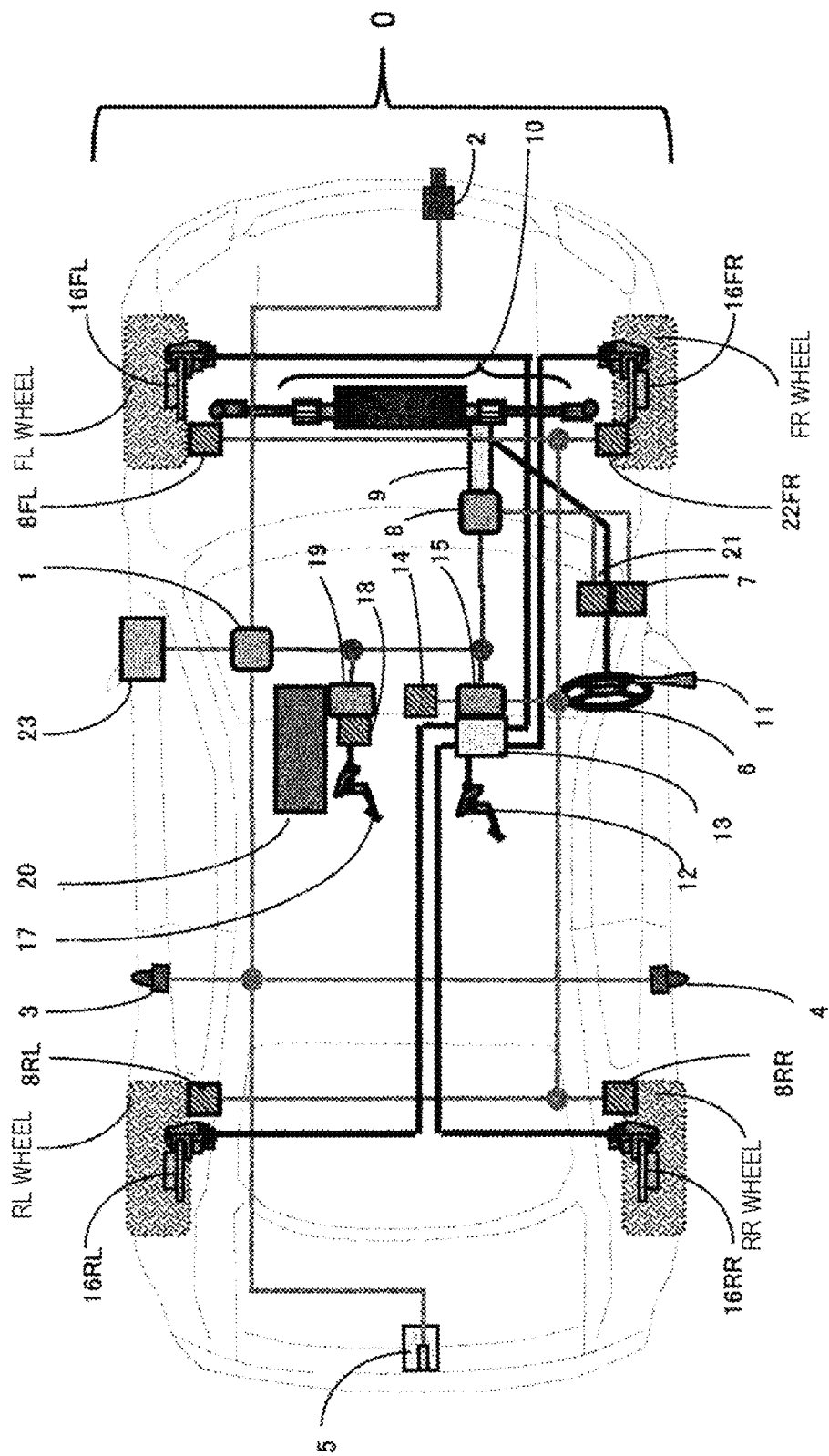
FIG. 1 is a system configuration diagram according to first and second embodiments.

First, a first embodiment will be described with reference to the drawings. FIG. 1 is a diagram illustrating a lane change system 0. Incidentally, an FL wheel means a front left wheel, an FR wheel means a front right wheel, an RL wheel means a rear left wheel, and an RR wheel means a rear right wheel.

The lane change system 0 includes: sensors that recognize external world which will be described later; a steering control mechanism 10, a brake control mechanism 13, and a throttle control mechanism 20 which are respective actuators configured to change lanes based on information from the sensors; a warning device 23; a vehicle control device 1 that calculates a command value with respect to each of the actuators 10, 13, and 20; a steering control device 8 that controls the steering control mechanism 10 based on the command value from the vehicle control device 1; a brake control device 15 that controls the brake control mechanism 13 based on the command value to adjust brake force distribution of each wheel; and a throttle control device 19 that controls the throttle control mechanism 20 based on the command value to adjust torque output of an engine.

For example, a stereo camera 2 on a front side, laser radars 3 and 4 on right and left sides, and a millimeter wave radar 5 on a rear side are provided as the sensors that recognize the external world, whereby it is possible to detect relative distances and relative speed of a host vehicle and peripheral vehicles. In addition, the front stereo camera 2 can detect a lateral position of a lane marker of a lane in which the host vehicle is traveling. Incidentally, the description has been given in the present embodiment regarding a combination of the above-described sensors as an example of a sensor configuration; however, the present invention is not limited thereto, and a combination with an ultrasonic sensor, a monocular camera, an infrared camera, and the like may be employed.

Then, the sensor signals are input to the vehicle control device 1. Signals from an automatic driving start button (not illustrated) and a lane change input device 11 are input to the vehicle control device 1. An automatic operation is started by input of the automatic driving start button (not illustrated). For example, a turn signal is used as the lane change input device 11, and a lane change support operation is started or stopped according to ON or OFF information thereof. However, the lane change input device 11 is not limited to the turn signal, and a dedicated input device may be used.

Although not illustrated in detail in FIG. 1, the vehicle control device 1 includes, for example, a CPU, a ROM, a RAM, and an input/output device. Software of the lane change control system to be described below is stored in the above-described ROM. The vehicle control device 1 calculates the command values of the respective actuators 10, 13, and 20 as will be described in detail later. The control devices 8, 15, and 19 of the respective actuators 10, 13, and 20 receive the command values of the vehicle control device 1 via communication and control the respective actuators based on the command values.

Next, an operation of a brake will be described. A depressing force of a driver depressing on a brake pedal 12 is boosted by a brake booster (not illustrated), and hydraulic pressure corresponding to the force is generated by a master cylinder (not illustrated). The generated hydraulic pressure is supplied to a wheel cylinder 16 via the brake control mechanism 13. Wheel cylinders 16FL to 16RR are constituted by a cylinder (not illustrated), a piston, a pad, and the like. The piston is propelled by a hydraulic fluid supplied from the master cylinder 9, and the pad connected to the piston is pressed against a disc rotor. Incidentally, the disc rotor rotates together with the wheel (not illustrated). Thus, a brake torque acting on the disc rotor serves as a brake force that acts between the wheel and a road surface. In the above-described manner, the braking force can be generated in each wheel according to the brake pedal operation of the driver.

Although not illustrated in detail in FIG. 1, the brake control device 15 includes, for example, a CPU, a ROM, a RAM, and an input/output device, which is similar to the vehicle control device 1. An inertia sensor 14 that can detect a longitudinal acceleration, a lateral acceleration, and a yaw rate, wheel speed sensors 8FL to 8RR installed in the respective wheels, a brake force command from the above-described brake control device 15, and a sensor signal from a steering wheel angle detection device 21 via the steering control device 8 to be described later are input to the brake control device 15. The output of the brake control device 15 is connected to the brake control mechanism 13 including a pump (not illustrated) and a control valve, and can generate an arbitrary braking force on each wheel independently from the brake pedal operation of the driver. The brake control device 15 estimates spin of the vehicle, drift-out, and lock of a wheel based on the above-described information, and generates the braking force on the corresponding wheel so as to suppress these spin, drift-out, and lock, thereby serving a role of enhancing steering stability of the driver. Furthermore, the vehicle control device 1 can generate an arbitrary brake force on the vehicle by communicating a brake command to the brake control device. In this application, however, the present invention is not limited to the brake control device described above, and other actuators such as a brake-by-wire may be employed.

Next, a steering operation will be described. A steering torque and a steering wheel angle input by the driver via a steering wheel 6 are detected by a steering torque detection device 7 and a steering wheel angle detection device 21, respectively, and the steering control device 8 controls the motor based on these pieces of information to generate an assist torque. Although not illustrated in detail in FIG. 1, the steering control device 8 also includes, for example, a CPU, a ROM, a RAM, and an input/output device, which is similar to the vehicle control device 1. The steering control mechanism is movable depending on a resultant force of the above-described steering torque of the driver and the assist torque by the motor, and the front wheels are turned. Meanwhile, it is configured such that a reaction force from the road surface is transmitted to the steering control mechanism in accordance with a turn angle of the front wheels and is transmitted to the driver as a road surface reaction force.

The steering control device 8 can generate a torque by the motor 9 independently from the steering operation of the driver and control the steering control mechanism 10. Accordingly, the vehicle control device 1 can control the front wheel to an arbitrary turn angle by communicating a target steering torque to the steering control device 8. Incidentally, the present invention is not limited to the steering control device, and the same effect is also obtained by employing other actuators such as the steer-by-wire.

Next, an accelerator will be described. The amount of depression of the driver on an accelerator pedal 17 is detected by a stroke sensor 18 and input to the throttle control device 19. Although not illustrated in detail in FIG. 1, the throttle control device 19 also includes, for example, a CPU, a ROM, a RAM, and an input/output device, which is similar to the vehicle control device 1. The throttle control device 19 adjusts a throttle opening in accordance with the depression amount of the accelerator pedal and controls the engine. In the above-described manner, the vehicle can be accelerated according to the accelerator pedal operation of the driver. The throttle control device 19 can control the throttle opening independently from the accelerator operation of the driver. Accordingly, the vehicle control device 1 can generate an arbitrary acceleration in the vehicle by communicating a target acceleration to the throttle control device 19.

As described above, the lane change system 0 can automatically change lanes by appropriately controlling the speed of the vehicle and controlling the steering by adjusting the brake and throttle in accordance with situations of the peripheral vehicle when the driver desires to change the lane.

Figure 2:
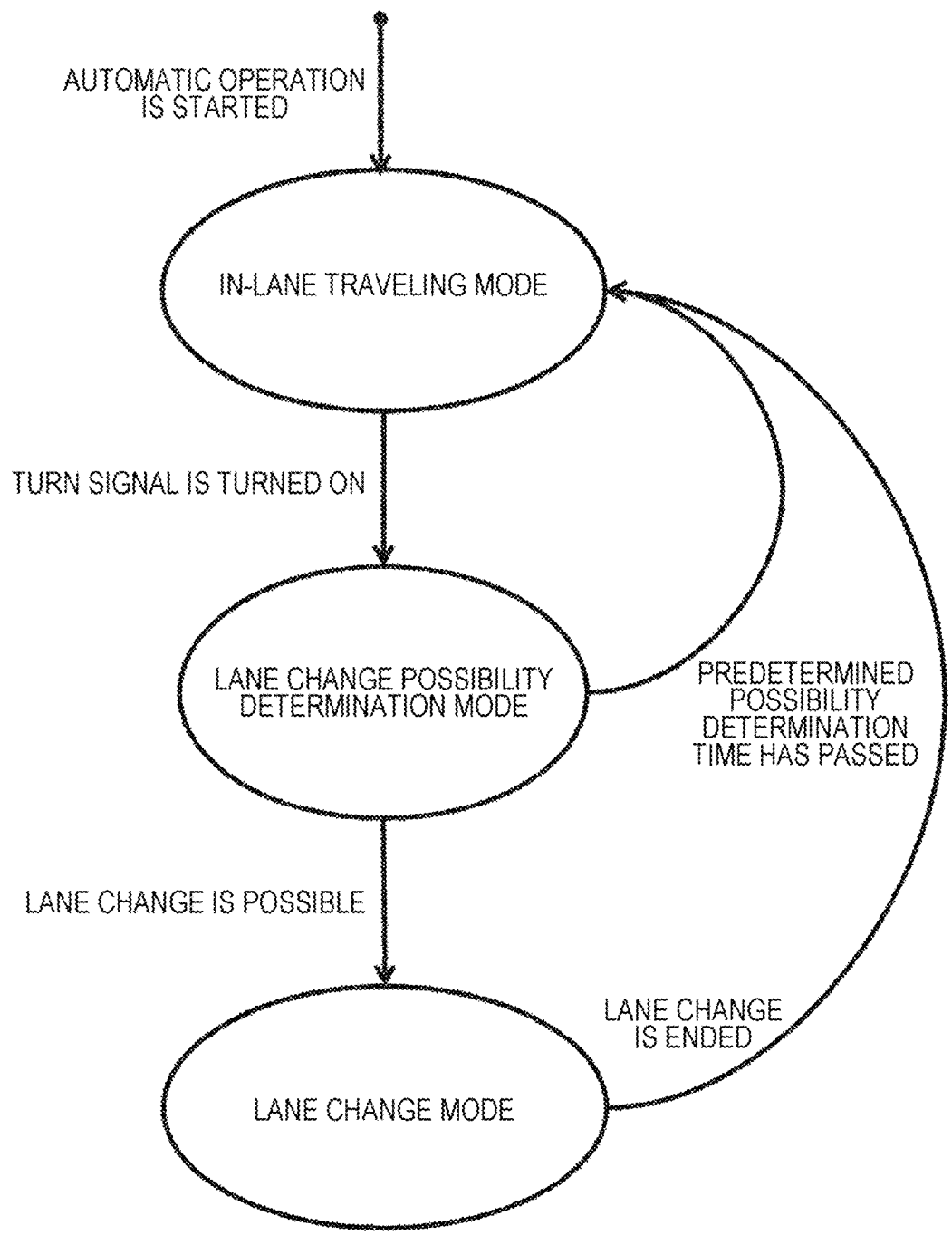
FIG. 2 is a state transition diagram according to the first and second embodiments.

FIG. 2 is a state transition diagram of the lane change system. First, an in-lane traveling mode is activated by input of the automatic driving start button. In the in-lane traveling mode, a lane keeping assist system (LKAS) and adaptive cruise control (ACC) mounted on the vehicle control device 1 cooperate with each other, whereby the vehicle automatically travels in the lane. When the turn signal is input in the in-lane traveling mode, the process is shifted to a lane change possibility determination mode. Whether the lane can be safely changed is determined based on the information on the peripheral vehicle in the lane change possibility determination mode as will be described in detail later. When it is determined that the lane change is possible, the process is shifted to the lane change mode. On the other hand, when a predetermined time (for example, one second) or longer has elapsed without determining that the lane change is possible in the lane change possibility determination mode, the process is shifted to the in-lane traveling mode, and the driver is notified of a fact that the lane change is not possible. A lane change path is generated based on information on the lane marker, and the lane is changed to an adjacent lane in the lane change mode as will be described in detail later. When the lane change is completed, the vehicle returns to the in-lane traveling mode, and the automatic operation is performed in the lane.

Figure 3:
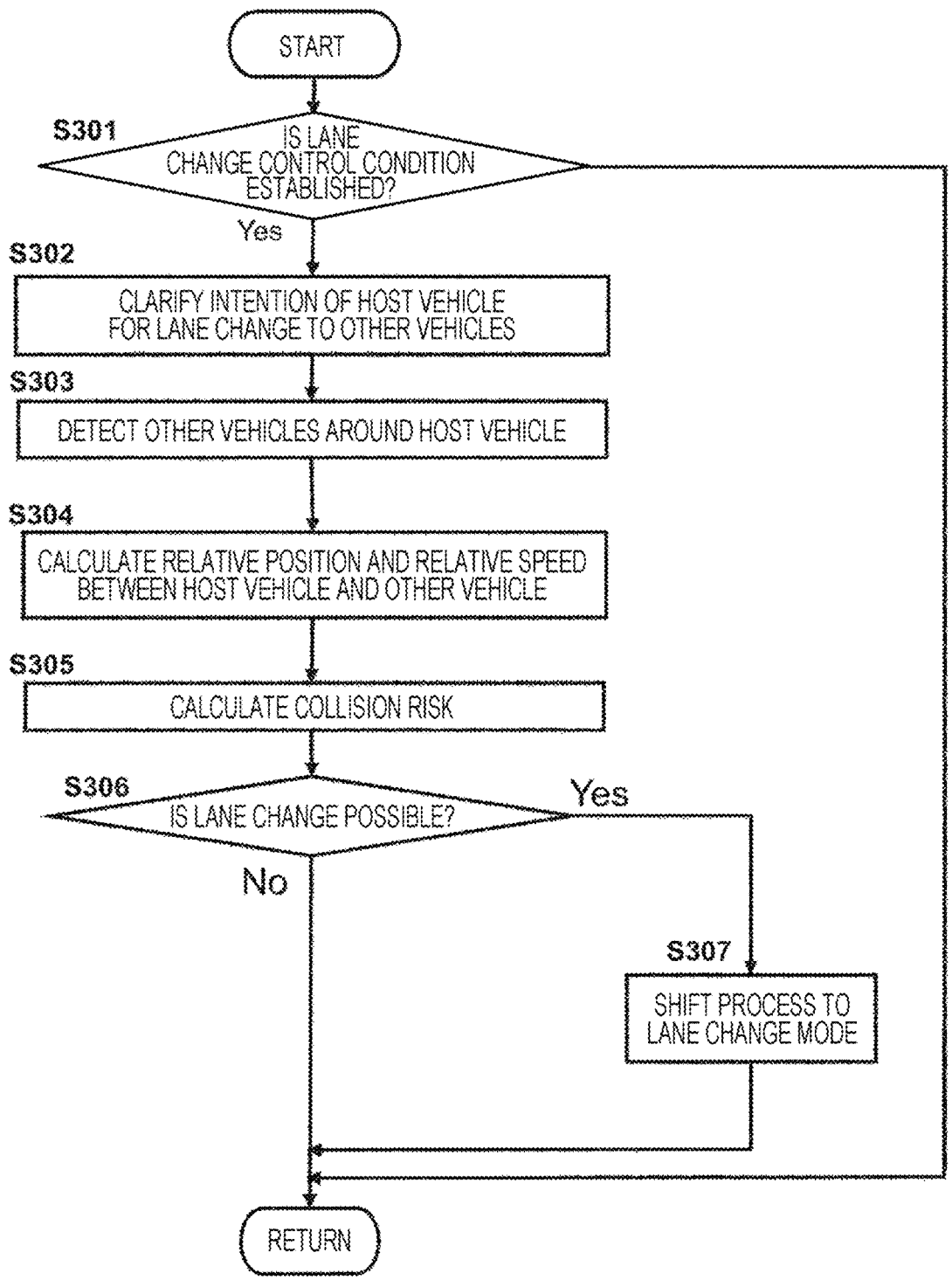
FIG. 3 is a flowchart of a lane change possibility determination mode according to the first and second embodiments.
Figure 4:
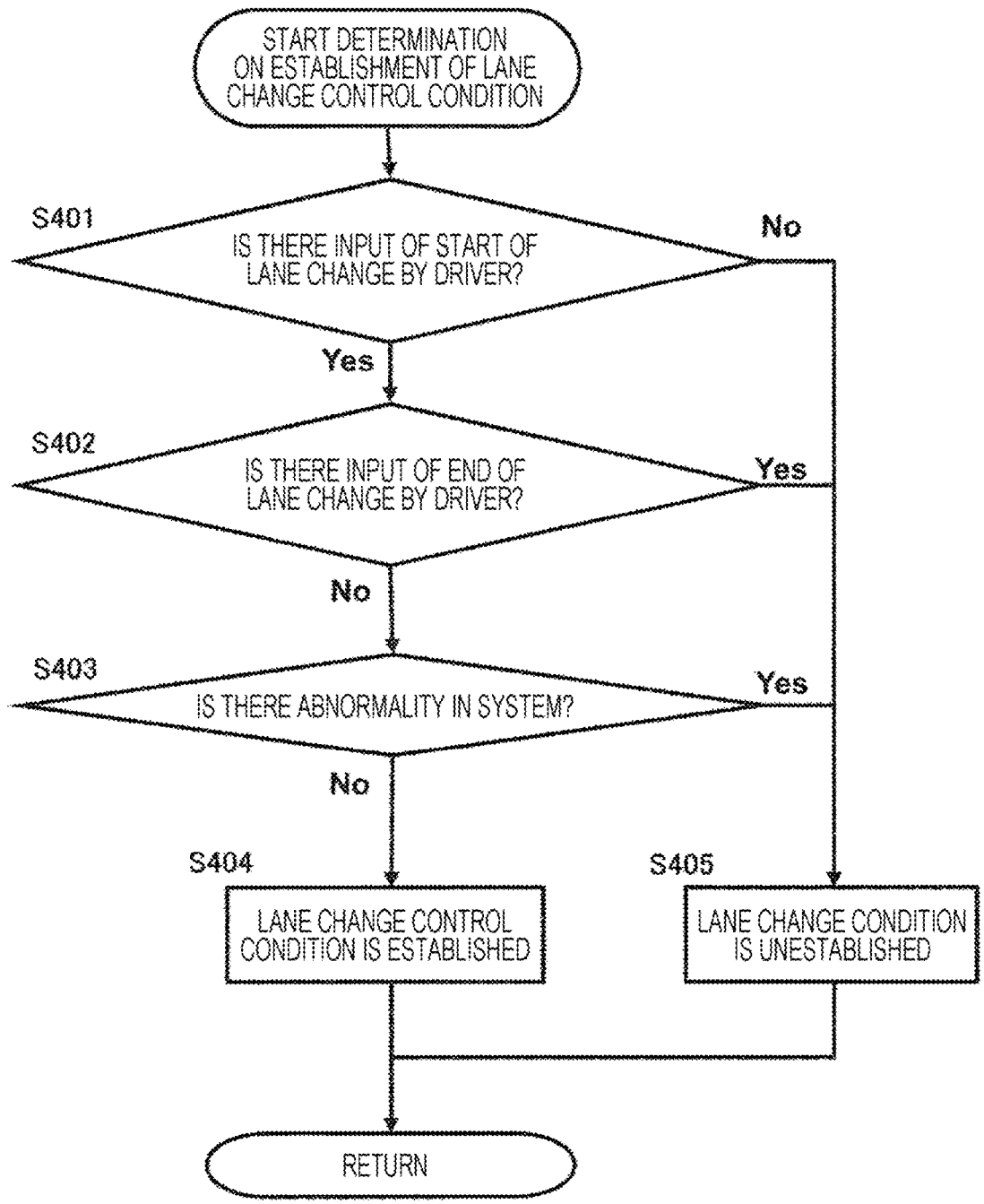
FIG. 4 is a view illustrating determination on establishment of a lane change control condition according to the first and second embodiments.

Next, a flowchart of the lane change possibility determination mode will be described with reference to FIG. 3. First, the vehicle control device 1 determines whether a lane change control condition is established (S301). S301 is executed according to a flowchart of FIG. 4. First, it is determined whether there is start input of the lane change input device 11 by the driver (S401). The process proceeds to S402 in the case of YES or it is determined that the lane change control condition is unestablished (S405) in the case of NO.

Next, it is determined whether there is end input of the lane change input device 11 by the driver (S402), and the process proceeds to S403 in the case of NO or to S405 in the case of YES.

Next, the vehicle control device 1 determines whether there is an abnormality in the system (S404). The process proceeds to S405 in the case of YES, and it is determined that the lane change control condition is unestablished. The process proceeds to S404 in the case of NO, and it is determined that the lane change control condition is established. As described above, based on the results of S401 to S405, it is determined whether the lane change control condition of S301 is established.

The process proceeds to S302 in the case of YES in S301 or proceeds to return processing in the case of NO. In the return processing, the process returns to the start of the flow in FIG. 3 after a lapse of a predetermined time (several tens ms to several hundreds ms). That is, it is configured such that whether the lane change control condition is established is constantly monitored, and the lane change control is started when the condition is established. Other flowcharts similarly return to the start of the flowchart after the lapse of the predetermined time after the return processing unless otherwise specified.

Next, the vehicle control device 1 performs a process of clarifying an intention of the host vehicle for the lane change, illustrated in FIG. 5, to another vehicle (S302). There is a method of turning on the turn signal illustrated in FIG. 5 (a) as a method of clarifying the lane change intention to the other vehicle. In addition, there is a method of controlling the vehicle so as to follow a boundary against an adjacent lane to which the vehicle desires to change the lane as illustrated in FIG. 5 (b). The vehicle control device 1 first detects the lane using the information of the stereo camera 2 installed on the front side in order to implement the above-described control. Then, a target yaw moment necessary for the vehicle is calculated based on vehicle body speed of the host vehicle to be described later and the above-described lane information. A target steering angle from the target yaw moment or the target yaw moment is calculated and is communicated to each of the steering control device 8 and the brake control device 15. In the above-described manner, it is possible to control the vehicle so as to follow the boundary against the adjacent lane.

The method of controlling the vehicle so as to follow the boundary against the adjacent lane is not limited to the above description, and other methods may be employed. Further, there is also a method of sending the lane change intention of the host vehicle to the other vehicle via vehicle-to-vehicle communication as illustrated in FIG. 5(c) as the method for clarifying the lane change intention of the host vehicle to the other vehicle. As described above, since the lane change intention of the driver is clearly transmitted to the other vehicle by the process of S302, the other vehicle can recognize the lane change intention of the host vehicle, and the lane can be smoothly changed. Next, the vehicle control device 1 detects other vehicles (including a vehicle invading the lane as the lane change destination at a junction or the like) that are traveling in the lane as the lane change destination of the vehicle using the external world recognition sensors 2, 3, 4, and 5 (S303).

Figure 6:
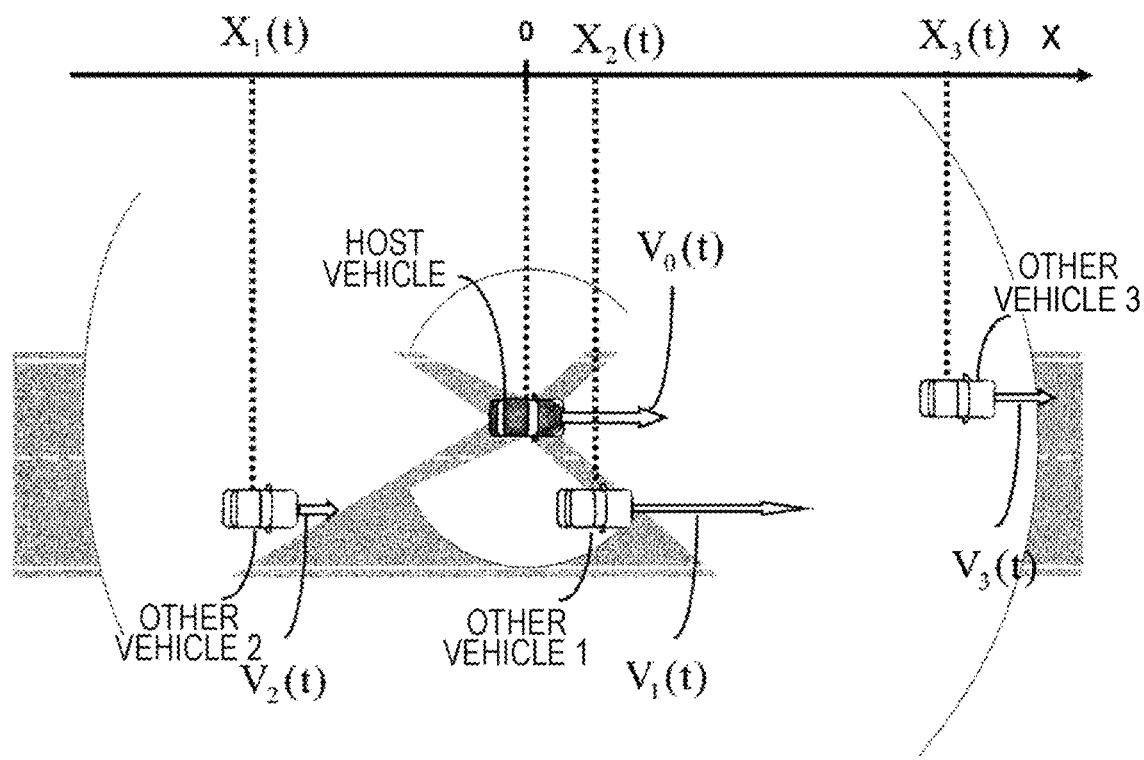
FIG. 6 is a view illustrating a relative position and relative speed of a peripheral vehicle according to the first and second embodiments.

In S304, relative positions and relative speed between the host vehicle and peripheral vehicles are calculated by the stereo camera 2 that detects the front side of the vehicle, the laser radars 3 and 4 that detect the right and left sides of the vehicle, and the millimeter wave radar 5 that detects the rear side of the vehicle as illustrated in FIG. 6. The relative positions and relative speed of the other vehicles are expressed using a coordinate system in which a position of the center of gravity of the vehicle is set as an origin and the front side of the vehicle is set as an X axis. A relative distance $X_i$ and relative speed $V_i$ between centers of gravity of the host vehicle and the peripheral vehicle in the X-axis direction at the time of t seconds can be expressed by

[Mathematical Formula 1].

$$\begin{cases} X_i(t) \\ V_i(t) = \dot{X}_i(t) \end{cases} (i = 1, 2, \ldots, i) \qquad (1)$$

Figure 7:
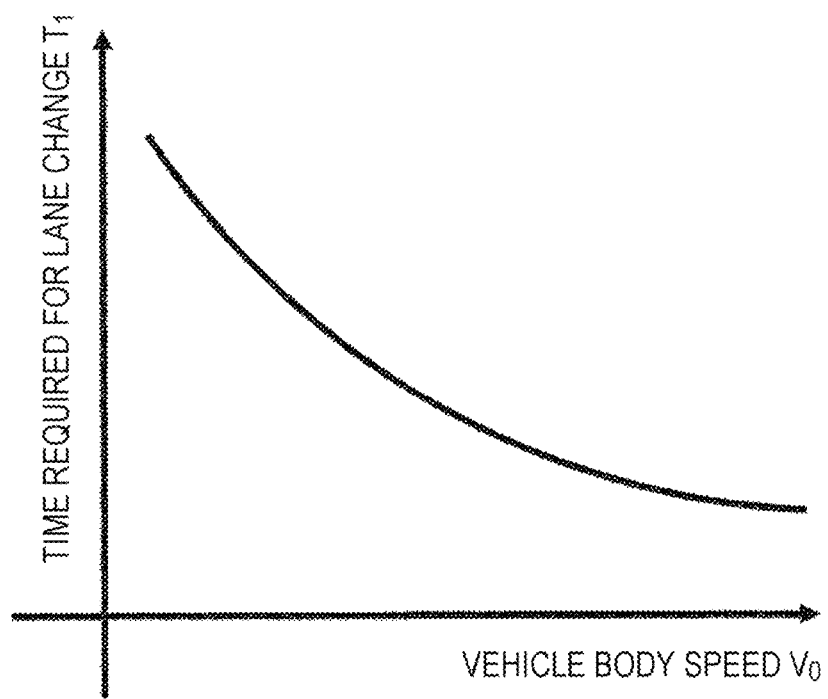
FIG. 7 is a view illustrating a relationship between vehicle body speed and time required for a lane change according to the first and second embodiments.

Next, a collision risk when the lane is changed is calculated based on the above relative position and relative speed (S305). First, the estimated vehicle body speed is input to a map of vehicle body speed and time required for a lane change illustrated in FIG. 6, and the time required for the lane change is calculated. The map of FIG. 7 is set such that the time required for the lane change shortens as the vehicle body speed increases. As a result, the time required for the lane change is short at high speed while the time shortens at low speed, and it is possible to appropriately calculate a time T1 required for a lane change in accordance with the vehicle body speed. Next, a vehicle-to-vehicle distance $Xi^{gap}(t+T1)$ and a collision prediction time $Ti^{ttc}(t+T1)$ representing the collision risk when the lane is changed (after the time T1

(seconds) required for the lane change) are calculated based on the calculated time T1 required for the lane change by the following Formula.

[Mathematical Formula 2]

$$X_i^{gap}(t+T_1) = |X_i(t+T_1)| - (L_0/2 + L_i/2) \quad (2)$$

[Mathematical Formula 3]

$$T_i^{ttc}(t+T_1) = \begin{cases} \dfrac{X_i^{gap}(t+T_1)}{V_i(t+T_1)} & (V_i > 0) \\ \infty & (V_i \leq 0) \end{cases} \quad (3)$$

However, $L_o$ represents a total length (longitudinal direction) of the host vehicle, and $L_i$ represents a length of a peripheral vehicle i.

Figure 8:
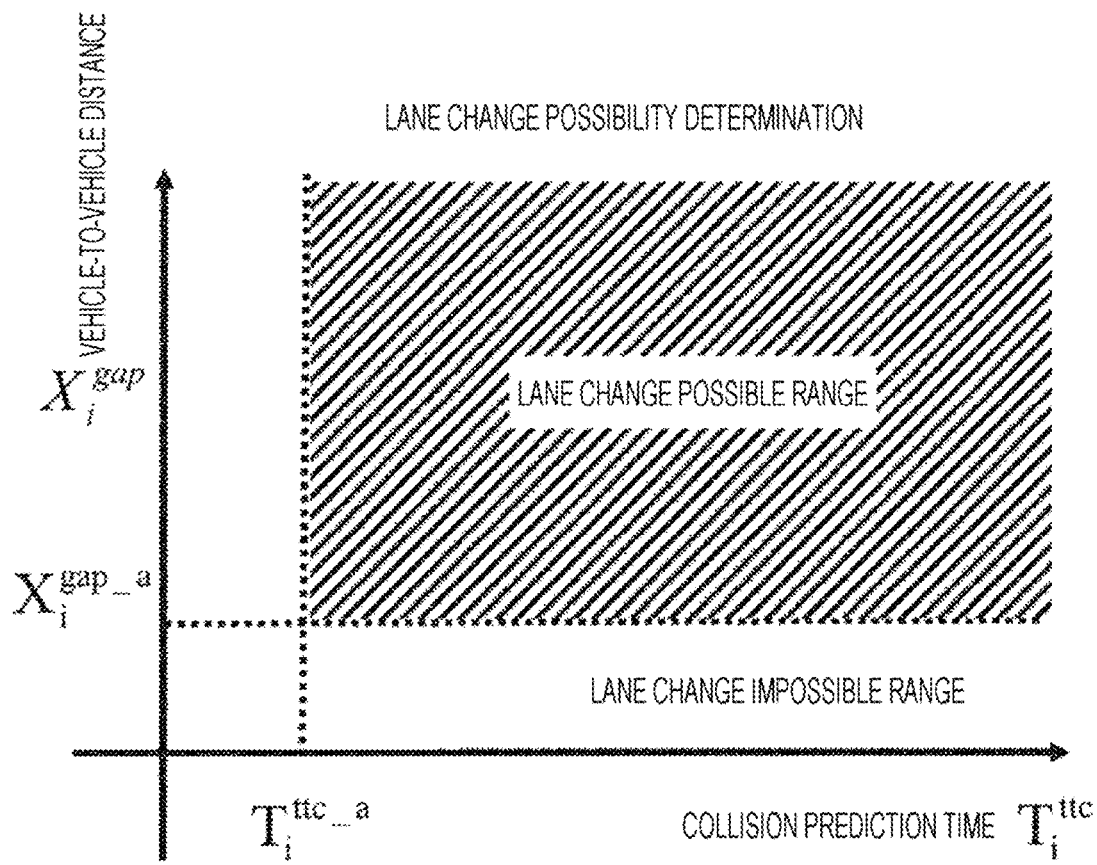
FIG. 8 is a view illustrating determination on possibility of the lane change according to the first and second embodiments.

Next, it is determined whether the lane change is possible using a map of FIG. 8 based on the vehicle-to-vehicle distance $Xi^{gap}(t+T1)$ and the collision prediction time $Ti^{ttc}(t+T1)$ obtained by Formulas (2) and (3) using FIG. 8 (S306). In FIG. 8, the vertical axis represents the vehicle-to-vehicle distance, and the horizontal axis represents the collision prediction time. A determination criterion is set such that it is determined that the lane change is possible when there is a sufficient margin for the relative distance and the collision prediction time with respect to all the peripheral vehicles, that is, when the following Formula is established, and it is determined that the lane change is impossible in the other cases.

[Mathematical Formula 4]

$$X_i^{gap}(t+T) > X_i^{gap\_a}$$

$$T_i^{TTC} > T_i^{TTC\_a} \quad (4)$$

Here, $X_1^{gap\_a}$ is a threshold (hereinafter referred to as a first predetermined value) of the relative distance for determination on whether the lane change is possible with respect to a front vehicle in a space (hereinafter referred to as a target space) to which the lane is desirably changed, and $X_2^{gap\_a}$ is a threshold (hereinafter referred to as a third predetermined value) of the relative distance for determination on whether the lane change is possible with respect to a rear vehicle in the target space. Each of the first and the third predetermined values is desirably a distance that makes the driver consider not to change the lane regardless of the relative speed when the driver is at such a relative distance (for example, the first predetermined value is 7 m and the third predetermined value is 10 m). Incidentally, these values are not fixed values and may be changed according to the vehicle speed or the driver. Meanwhile, $T_1^{TTC\_a}$ is a threshold (hereinafter referred to as a second predetermined value) of the collision prediction time for determination on whether the lane change is possible with respect to the front vehicle in the target space, and $T_2^{TTC\_a}$ is a threshold (hereinafter referred to as a fourth predetermined value) of the collision prediction time for determination on whether the lane change is possible with respect to the rear vehicle in the target space. Each of the second and the fourth predetermined values is desirably a time that makes the driver feel danger in the case of obtaining such a collision prediction time (for example, the second predetermined value is 5 S and the fourth predetermined value is 6 S). Incidentally, these values are not fixed values, either and may be changed according to the vehicle speed or the driver.

Based on this determination criterion, it is determined that the lane change is impossible, for example, when the lane change is tried in a state where the collision prediction time is short although the relative distance is long (the relative speed is high), that is, when a following vehicle may catch up the host vehicle immediately after the lane change. Further, it is possible to determine that the lane change is not possible when the relative distance is short although the relative speed is negative, that is, the vehicle is moving away. When it is determined that the lane change is possible by the above determination, the process is shifted to the lane change mode in S307. On the other hand, the process proceeds to the return processing when it is determined that lane change is impossible. Here, the lane change possibility determination is not limited to FIG. 8, and for example, the horizontal axis in FIG. 8 may be replaced with the relative speed.

Figure 9:
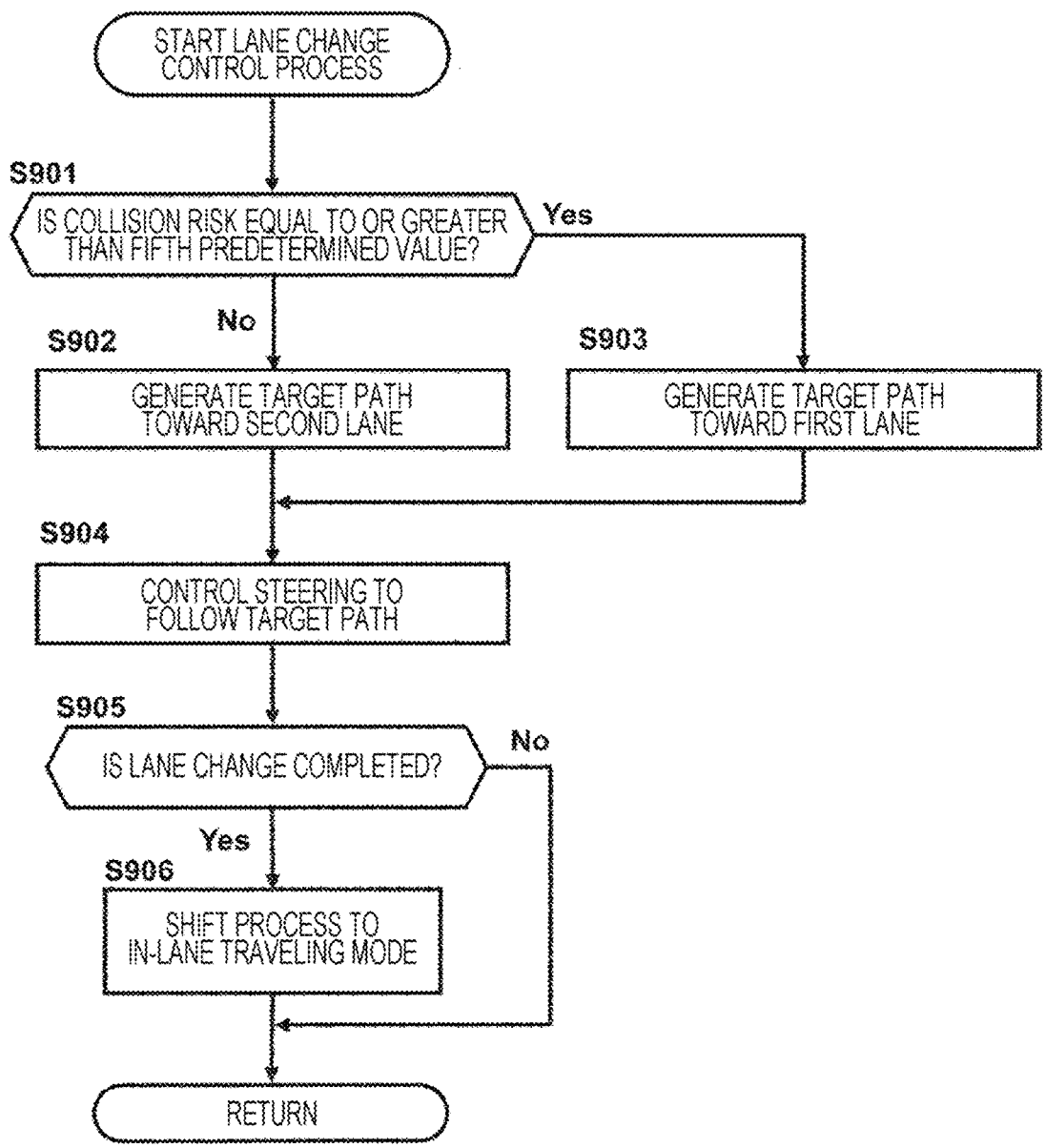
FIG. 9 is a flowchart of a lane change mode according to the first and second embodiments.

Next, FIG. 9 illustrates the process of the lane change mode. In S901, the collision prediction time obtained in S305 is used as the collision risk. However, the collision risk is not necessarily limited to the above collision prediction time, and may be another indicator such as the probability of collision. When the collision risk is not equal to or greater than a fifth predetermined value (No in S901), a path is generated toward the second lane. The fifth predetermined value is a threshold for determining that a collision occurs unless the path is immediately changed, and is set to 3 S, for example. When the collision risk is equal to or greater than the fifth predetermined value (Yes in S901), a path is generated toward the first lane. Subsequently, in S904, the steering control is performed so as to follow the target path based on the target path generated in S902 and 903. In S905, it is determined whether the lane change has been completed, and the process is shifted to the in-lane traveling mode in S906 when it is determined that the lane change has been completed. When it is determined that the lane change has not been completed, the process proceeds to the return processing. As illustrated in FIG. 9, the collision risk with the peripheral vehicle is determined during the lane change, the target path is generated toward the first lane when the collision risk is equal to or greater than the predetermined value, and the steering control is performed so as to follow the path. Accordingly, it is possible to correct the path by determining that the collision risk is high even if a parallel running vehicle has changed the lane from another lane to the change destination lane when the host vehicle changes the lane, and it is possible to ensure the safety.

An operation example of the above-described lane change system will be described. FIG. 10 illustrates an operation example in a case where a lane is changed when there is no vehicle running parallel to the host vehicle. Incidentally, a lane in which the host vehicle is traveling is referred to as a first lane, a lane to which the host vehicle intends to change the lane is referred to as a second lane, and a lane adjacent to the second lane is referred to as a third lane. In FIG. 10 (a), the driver turns on the turn signal to the left direction while the host vehicle is traveling in the lane. The processes described in FIGS. 2, 3, 4, and 9 are performed using the driver's input as a trigger. Here, the characteristic process of FIG. 9 will be described. There is no peripheral vehicle in the case of FIG. 10 (a), and thus, it is determined that the collision risk is not equal to or greater than the fifth predetermined value in S901, and a target path is generated toward the second lane in S902. In S904, the steering control is performed so as to follow the target path. The same control as in FIG. 10 (a) is executed in FIG. 10 (b), and the vehicle is moving toward the adjacent lane. In FIG. 10 (c), it is determined that the lane change has been completed in the processing of S905, the process is shifted to the in-lane traveling mode, and the vehicle travels in the center of the lane as the lane change destination. In this manner, the collision risk with the peripheral vehicle is determined during the lane change, and the target path is generated toward the second lane when it is determined that the collision risk is not equal to or greater than the fifth predetermined value, and the lane can be changed. That is, it is possible to realize the lane change when it is determined as safe by confirming the safety even during the lane change.

Next, FIG. 11 illustrates an operation example of the lane change system in a case where there is a vehicle running parallel to the host vehicle. In FIG. 11 (a), the other vehicle in the third lane operated by a driver is to change the lane toward the second lane. Meanwhile, the lane change system performs the steering control toward the second lane, which is similar to FIG. 10 (a). In FIG. 11 (b), the other vehicle continues the lane change toward the second lane. In regard to this, the host vehicle can return to the own lane that is safe as it is determined that the collision risk is equal to or greater than the fifth predetermined value in S901, a target path is generated toward the first lane in S903, and the steering control is performed so as to follow the target path in S904. That is, it is possible to determine that the collision risk is high and correct the path even when the parallel running vehicle has changed the lane from another lane to the change destination lane while the host vehicle is changing the lane so that it is possible to ensure the safety.

In FIG. 11(c), it is determined that the lane change is ended, and the process returns to the automatic operation in the lane. This indicates that the vehicle can return to the first lane and continue the automatic operation even if there is the possibility of the collision with another vehicle during the lane change. That is, there is no need to activate the automatic operation again, and it is possible to implement the system that is highly receptive to the driver.

Second Embodiment

Figure 12:
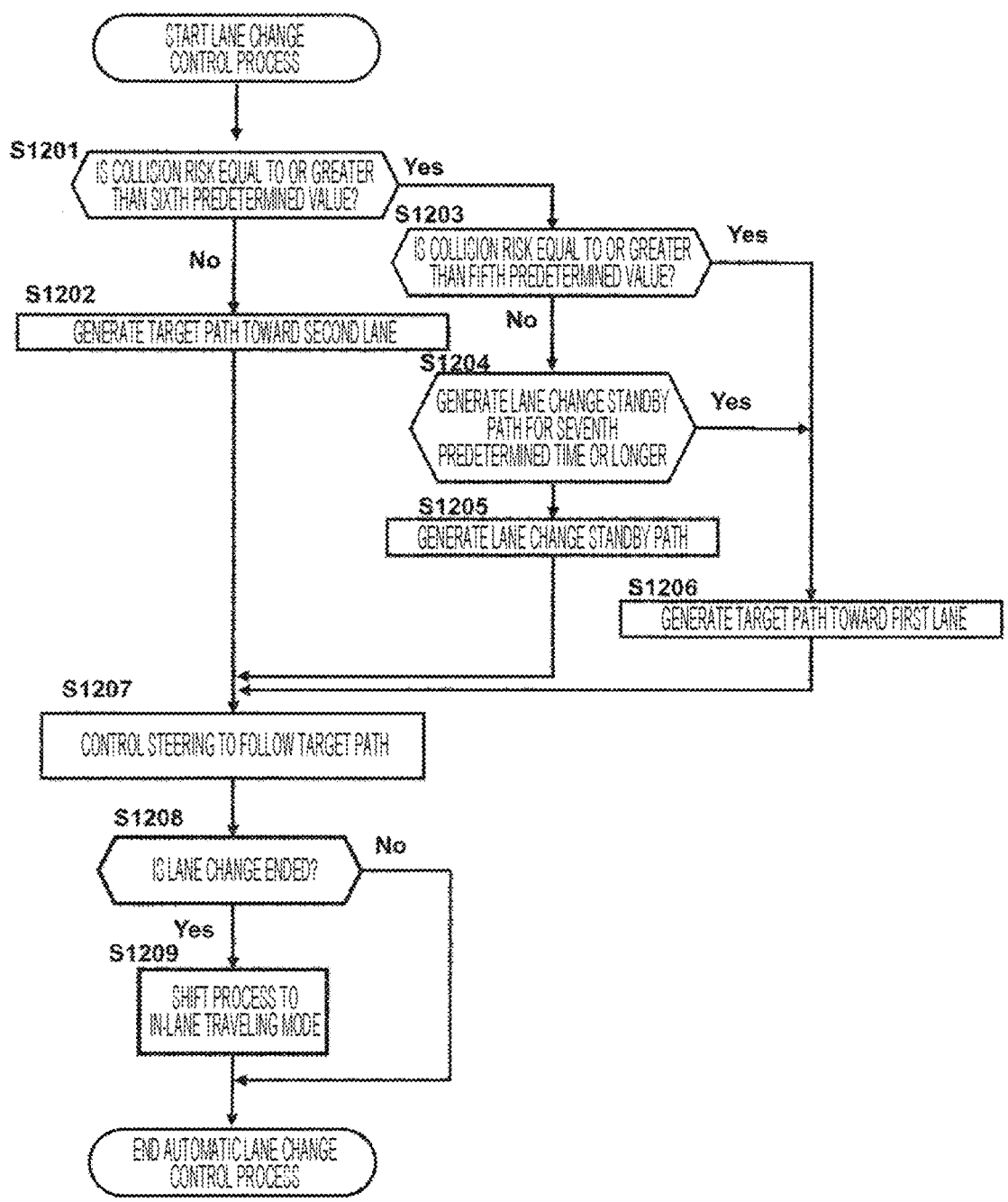
FIG. 12 is a flowchart of the lane change mode according to the second embodiment.

Next, a lane change system of a second embodiment will be described. Parts having the same function as those of the first embodiment will not be described. FIG. 12 illustrates a process of a lane change mode according to the second embodiment. When a collision risk calculated in S305 is not equal to or greater than a sixth predetermined value in S1201 (No in S1201), a path is generated toward the second lane in S1202. The sixth predetermined value is a threshold for determination on whether a collision occurs after several seconds, and is desirably set to a time (for example, 5 S) longer than the fifth threshold. When the collision risk is equal to or greater than the predetermined value (Yes in S1201), the process proceeds to S1203.

Whether the collision risk is equal to or greater than the sixth predetermined value is determined in S1203. A target path is generated toward the first lane in S1206 when it is determined that the collision risk is equal to or greater than the predetermined value (Yes in when S1203), or the process proceeds to S1204 when it is determined that the collision risk is not equal to or greater than the predetermined value (No in S1203). Whether the vehicle continues to travel in the lane change standby path for a seventh predetermined time or longer is determined in S1204, and the process proceeds to S1206 when it is determined that standby time is equal to or longer than the predetermined time (Yes in S1204). The seventh predetermined value is a value that defines how long the host vehicle may travel in the lane change standby path, and is desirably defined on consideration of traffic rules, traffic conditions of each country, manners, and the like. When it is determined that the vehicle does not continue traveling in the lane change standby path for the seventh predetermined time or longer (No in S1204), the lane change standby path is generated in S1205. The processing from S1207 to S1209 is the same as the processing described in S904 to S906.

Here, the lane change standby path is a path along which the vehicle travels in parallel with the lane marker, which is the path that does not approach either the first lane or the second lane. In this manner, it is possible to make the other vehicle notice the host vehicle while maintaining the safety by traveling on the lane change standby path and clarifying an intention of the host vehicle to change the lane to the other vehicle. That is, there is a possibility that the other vehicle recognizes the intention of the host vehicle for the lane change and makes a way, and thus, it is possible to improve a success rate of the lane change and to expect improvement inconvenience of the lane change system.

A position of the path changes according to the timing when the other vehicle travels in the lane in this lane change standby path. The fifth predetermined value is set to, for example, about three seconds when the host vehicle travels in the first lane during travel on the lane change standby path, and the fifth predetermined value is set to, for example, about 0.1 second when the host vehicle travels out of the first lane during travel on the lane change standby path. In this manner, the time that the host vehicle travels out of the first lane becomes short, and it is possible to expect the improvement of the safety of the lane change. The fifth predetermined value may be set to zero second depending on a travel state. In such a case, the vehicle does not travel on the lane change standby path. Further, when the host vehicle enters a junction, the fifth predetermined value is set to be great. In this manner, other vehicles traveling on a lane as a junction destination easily notice the entering of host vehicle at the time of joining, and thus, the host vehicle can smoothly enter the junction.

In addition, it is possible to prevent both the host vehicle and the parallel running vehicle from continuing to travel on the lane change standby path by adding the processing of S1204 when the same lane change system is operated at the same time in both the vehicles.

An operation example of the lane change system in a case where the lane change system of the second embodiment described above is applied will be described. As illustrated in FIG. 13(a), the other vehicle in the third lane operated by a driver is to change the lane toward the second lane. Meanwhile, the lane change system performs the steering control toward the second lane. In FIG. 13(b), the other vehicle continues the lane change toward the second lane. On the other hand, in the host vehicle, it is determined that the collision risk is equal to or greater than the sixth predetermined value in S1201, it is determined that the collision risk is not equal to or greater than the fifth predetermined value in S1203, it is determined that the lane change standby path has not been generated for the seventh predetermined time or longer in S1204, and the lane change standby path is generated in S1205.

Figure 13:
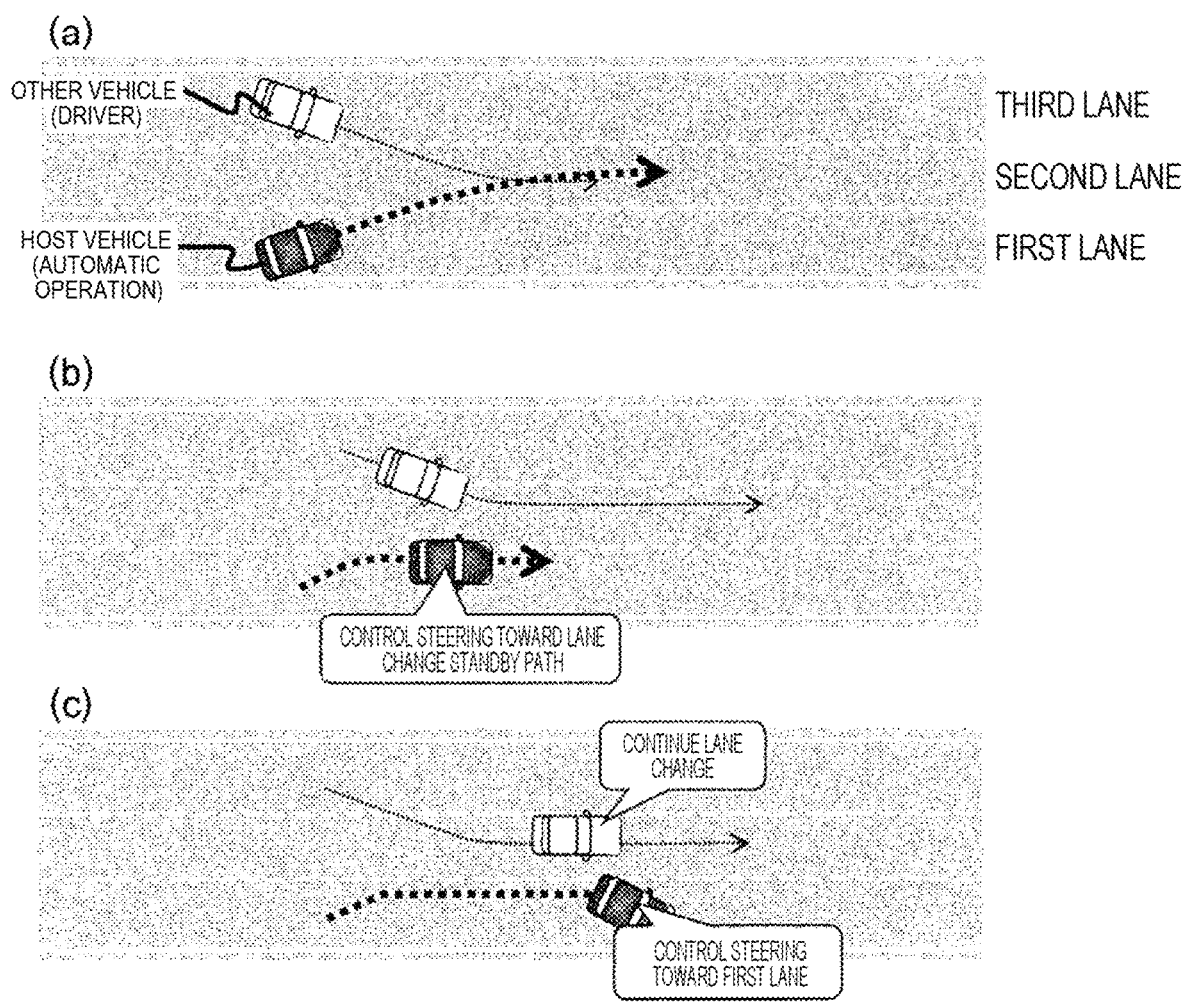
FIG. 13 is Operation Example 1 of a lane change system according to the second embodiment.

In FIG. 13 (c), the other vehicle notices that the host vehicle is traveling on the lane change standby path and stops the lane change. Meanwhile, since the collision risk is reduced, the lane change system generates a target path toward the second lane as the collision risk in S1201 is below the sixth predetermined value.

As described above, the vehicle travels on the lane change standby path and clarifies the intention of the host vehicle for the lane change to the other vehicle even when the parallel running vehicle has changed the lane from another lane to the change destination lane while the host vehicle is changing the lane according to the lane change system of the second embodiment. Thus, it is possible to improve the success rate of the lane change and to improve the convenience of the lane change system.

Next, an operation example of the lane change system according to the second embodiment in a case where another vehicle continues a lane change will be described. FIGS. 14(a) and 14(b) illustrate the same processing as that in FIG. 13, and thus, will not be described. In FIG. 14(c), the other vehicle continues to change the lane without noticing the host vehicle. The lane change system determines that the collision risk is equal to or greater than the fifth predetermined value in S1203 and generates the target path toward the first lane, that is, performs the steering control so as to return to the original lane.

As described above, the vehicle can stop the lane change and return to the own lane that is safe when the collision risk increases during travel on the lane change standby path. Further, the vehicle can return to the first lane and continue the automatic operation even if there is a possibility of the collision with another vehicle during the lane change. That is, there is no need to activate the automatic operation again, and it is possible to implement the system that is highly receptive to the driver.

Although the embodiments have been described as above, specific configurations are not limited to the respective embodiments, and design changes and the like made within the scope not departing from a gist of the invention are also included in the present invention.

REFERENCE SIGNS LIST 0 lane change system
1 vehicle control device
2 external world recognition sensor (stereo camera)
3, 4 external world recognition sensor (laser radar)
5 external world recognition sensor (millimeter wave radar)
6 steering wheel
7 steering torque detection device
8 steering control device
9 motor
10 actuator (steering control mechanism)
11 lane change input device
12 brake pedal
13 actuator (brake control mechanism)
14 inertial sensor
15 brake control device
16FL to 16RR wheel cylinder
17 accelerator pedal
18 stroke sensor
19 throttle control device
20 actuator (throttle control mechanism)
21 steering wheel angle detection device
22FL to 22RR wheel speed sensor
23 warning device

The invention claimed is:

1. A lane change system for a host vehicle, comprising:
a sensor;
an actuator; and
a vehicle control device configured to determine a command for the actuator, the vehicle control device further configured to:
operate in a first mode for in-lane travel in which the vehicle control device controls steering to travel on a first path in a middle region of a first lane;
operate in a second mode in which the vehicle control device determines a possibility of implementing a lane change from the first lane to a second lane adjacent to the first lane, and in which the vehicle control device controls steering to travel on a second path in a standby region of the first lane that is adjacent to the second lane; and
operate in a third mode in which the vehicle control device changes lanes by controlling steering in accordance with a third path moving from the standby region of the first lane to the second lane, wherein
when operating in the second mode, the vehicle control device determines not to shift to the third mode when the vehicle control device determines that there is a peripheral vehicle with a high collision risk in the second lane.

2. The lane change system according to claim 1, wherein the collision risk is calculated based on a relative position and/or relative speed of the host vehicle with respect to the peripheral vehicle, and
when operating in the second mode, the vehicle control device controls steering to travel a fourth path to the central region of the first lane when the vehicle control device determines that the collision risk is greater than a first threshold.

3. The lane change system according to claim 1, wherein the standby region of the first lane is parallel to the second lane.

4. The lane change system according to claim 2, wherein the vehicle control device controls steering to travel a path to the central region of the first lane when the vehicle control device determines that a time during which the host vehicle is traveling in the standby region of the first lane is longer than a second threshold.

5. The lane change system according to claim 4, wherein the second threshold is set to be shorter in a case where the standby region of the first lane is closer to the second lane than to the central region of the first lane than in a case where the standby region of the first lane is farther from the second lane than from the central region of the first lane.

6. The lane change system according to claim 4, wherein the second threshold is set to be longer in a case where the host vehicle enters a junction than in a case where the host vehicle does not enter a junction.

7. The lane change system according to claim 1, further comprising a lane change input device, wherein the vehicle control device is configured to shift from the first mode to the second mode when the lane change input device is activated.

* * * * *